(12) United States Patent
Zhang et al.

(10) Patent No.: US 12,198,443 B2
(45) Date of Patent: Jan. 14, 2025

(54) PARKING SPOT DETECTION METHOD AND PARKING SPOT DETECTION SYSTEM

(71) Applicant: NIO TECHNOLOGY (ANHUI) CO., LTD, Hefei (CN)

(72) Inventors: Kai Zhang, Hefei (CN); Shiting Wang, Hefei (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 349 days.

(21) Appl. No.: 17/590,533

(22) Filed: Feb. 1, 2022

(65) Prior Publication Data

US 2022/0245952 A1    Aug. 4, 2022

(30) Foreign Application Priority Data

Feb. 2, 2021   (CN) .......................... 202110140680.7

(51) Int. Cl.
*G06V 20/58*      (2022.01)
*G06T 7/70*       (2017.01)
(Continued)

(52) U.S. Cl.
CPC .............. *G06V 20/586* (2022.01); *G06T 7/70* (2017.01); *G06V 10/7715* (2022.01);
(Continued)

(58) Field of Classification Search
CPC .. G06V 20/586; G06V 10/7715; G06V 10/82; G06V 10/44; G06T 7/70;
(Continued)

(56) References Cited

U.S. PATENT DOCUMENTS

2023/0102253 A1*   3/2023   Lv .................... B60W 30/06
                                                              382/100

FOREIGN PATENT DOCUMENTS

CN      110348297           10/2019
CN      110598512 A    *   12/2019    ......... G06K 9/00798
(Continued)

OTHER PUBLICATIONS

A. Liu, Y. Yang, Q. Sun and Q. Xu, "A Deep Fully Convolution Neural Network for Semantic Segmentation Based on Adaptive Feature Fusion," 2018 5th International Conference on Information Science and Control Engineering (ICISCE), Zhengzhou, China, 2018, pp. 16-20, doi: 10.1109/ICISCE.2018.00013. (Year: 2018).*

(Continued)

*Primary Examiner* — Matthew C Bella
*Assistant Examiner* — Janice E. Vaz
(74) *Attorney, Agent, or Firm* — Sheridan Ross P.C.

(57) ABSTRACT

The invention relates to a parking spot detection method and system. The method includes: acquiring a parking lot image including one or more idle and occupied parking spots around a vehicle; inputting the parking lot image to a neural network model for image processing, to obtain center point coordinates and a center point probability of the parking spot, first coordinates and first corner point probabilities of four corner points, and offsets of the four corner points relative to the center point coordinates; calculating second coordinates of the four corner points based on the center point coordinates and the offsets of the four corner points relative to the center point coordinates; correcting the second coordinates of the four corner points by using the first coordinates of the four corner points, to obtain actual coordinates and actual corner point probabilities of the four corner points; and performing parking spot detection based on the center point coordinates and the center point probability, and the actual coordinates and actual corner point probabilities of the four corner points. According to the invention, the parking spot can be accurately detected.

12 Claims, 3 Drawing Sheets

(51) Int. Cl.
*G06V 10/77* (2022.01)
*G06V 10/82* (2022.01)

(52) U.S. Cl.
CPC .... *G06V 10/82* (2022.01); *G06T 2207/20084* (2013.01); *G06T 2207/30264* (2013.01)

(58) Field of Classification Search
CPC . G06T 2207/20084; G06T 2207/30264; G06F 18/2415; G06N 3/08; G08G 1/14
See application file for complete search history.

(56) References Cited

FOREIGN PATENT DOCUMENTS

| CN | 110796063 | | 2/2020 | |
|---|---|---|---|---|
| CN | 110796063 A | * | 2/2020 | ......... G06K 9/00798 |
| CN | 111428616 | | 7/2020 | |

OTHER PUBLICATIONS

Extended Search Report for European Patent Application No. 22153905.9, dated Jun. 29, 2022, 9 pages.

* cited by examiner

PARKING SPOT DETECTION METHOD AND PARKING SPOT DETECTION SYSTEM

CROSS-REFERENCE TO RELATED APPLICATION

This application claims the benefit of China Patent Application No. 202110140680.7 filed Feb. 2, 2021, the entire contents of which are incorporated herein by reference in its entirety.

TECHNICAL FIELD

The invention relates to autonomous driving technologies, and specifically to a parking spot detection method and a parking spot detection system based on parking spot corner points.

BACKGROUND ART

Autonomous driving technology, also known as unmanned driving technology, is an intelligent vehicle technology that implements unmanned driving through a computer system. The autonomous driving technology relies on cooperation between artificial intelligence, visual computing, radar, a monitoring apparatus, a global positioning system, etc., so that a computer system can autonomously and safely operates a vehicle without any human active operation.

Automatic parking technology refers to automatic parking of a vehicle without manual control. Different automatic parking systems use different methods to detect objects around a vehicle. Some are sensors mounted on the front and back of the vehicle, and some are cameras or radars mounted on the vehicle to detect obstacles. The vehicle detects parked vehicles, the size of a parking spot, and a distance to the roadside, and then parks the vehicle into the parking spot.

At present, a radar-based automatic parking system can detect a parking spot between two vehicles, but cannot deal with a parking spot marked on an open space. In addition, the radar sometimes erroneously detects a parking stopper in a parking spot, causing parking to be terminated before the vehicle fully enters the parking spot. Compared with the radar-based automatic parking system, a vision-based parking spot detection algorithm supports detection of a parking spot marked on an open space.

SUMMARY OF THE INVENTION

In view of the above problem, the invention is to provide a parking spot detection method and a parking spot detection system that can accurately detect a parking spot.

An aspect of the invention provides a parking spot detection method, the method including:
- an image acquisition step of acquiring a parking lot image including one or more idle and occupied parking spots around a vehicle;
- an image processing step of inputting the parking lot image to a neural network model for image processing, to obtain center point coordinates and a center point probability of the parking spot, first coordinates and first corner point probabilities of four corner points, and offsets of the four corner points relative to the center point coordinates;
- a coordinate calculation step of calculating second coordinates of the four corner points based on the center point coordinates and the offsets of the four corner points relative to the center point coordinates;
- a coordinate correction step of correcting the second coordinates of the four corner points by using the first coordinates of the four corner points, to obtain actual coordinates and actual corner point probabilities of the four corner points; and
- a parking spot detection step of performing parking spot detection based on the center point coordinates and the center point probability, and the actual coordinates and actual corner point probabilities of the four corner points.

Optionally, in the coordinate correction step, for each of the four corner points, an area of a preset size is divided with a position of the second coordinates of the corner point as the center, the first coordinates of the corner point are found in the area, and the second coordinates are replaced with the first coordinates found.

Optionally, in the parking spot detection step, a final probability of the parking spot is calculated based on the center point probability and the actual corner point probabilities of the four corner points.

Optionally, in the parking spot detection step, the center point probability is P0, probabilities of corrected corner points of the four corner points are P1, P2, P3, and P4, respectively, and the final probability P of the parking spot is $0.6*P0+0.1*(P1+P2+P3+P4)$.

Optionally, in the image processing step, for the parking lot image, a preset picture size is used, image features are extracted through a plurality of convolutional layers and downsampling layers, a cross-layer connection is used to fuse low-layer edge features and high-layer semantic features, then the preset picture size is restored through an upsampling layer, and center point coordinates and a center point probability of the parking spot, first coordinates and first corner point probabilities of the four corner points, and offsets (X, Y, L) of the four corner points relative to the center point coordinates are predicted at the output layer, where X, Y, and L represent an X direction, a Y direction, and a distance, respectively.

Optionally, the output layer includes 10 layers of corner point feature maps of the preset picture size, and 12 layers of offset feature maps of the preset picture size, where the first five layers of corner point feature maps represent idle parking spots, the last five layers represent occupied parking spots, each of the five layers represents features of the center point and the four corner points, the idle parking spots and the occupied parking spots share the offset feature maps, and each corner point has three offsets, representing the X direction, the Y direction, and the distance L, respectively, with a total of four corner points and 12 layers of features.

An aspect of the invention provides a parking spot detection system, the system including:
- an image acquisition module configured to acquire a parking lot image including one or more idle and occupied parking spots around a vehicle;
- an image processing module configured to input the parking lot image to a neural network model for image processing, to obtain center point coordinates and a center point probability of the parking spot, first coordinates and first corner point probabilities of four corner points, and offsets of the four corner points relative to the center point coordinates;
- a coordinate calculation module configured to calculate second coordinates of the four corner points based on the center point coordinates and the offsets of the four corner points relative to the center point coordinates;

a coordinate correction module configured to correct the second coordinates of the four corner points by using the first coordinates of the four corner points, to obtain actual coordinates and actual corner point probabilities of the four corner points; and a parking spot detection module configured to perform parking spot detection based on the center point coordinates and the center point probability, and the actual coordinates and actual corner point probabilities of the four corner points.

Optionally, in the coordinate correction module, for each of the four corner points, an area of a preset size is divided with a position of the second coordinates of the corner point as the center, the first coordinates of the corner point are found in the area, and the second coordinates are replaced with the first coordinates found.

Optionally, in the parking spot detection module, a final probability of the parking spot is calculated based on the center point probability and the actual corner point probabilities of the four corner points.

Optionally, in the parking spot detection module, the center point probability is P0, probabilities of corrected corner points of the four corner points are P1, P2, P3, and P4, respectively, and the final probability P of the parking spot is $0.6*P0+0.1*(P1+P2+P3+P4)$.

Optionally, in the image processing module, for the parking lot image, a preset picture size is used, image features are extracted through a plurality of convolutional layers and downsampling layers, a cross-layer connection is used to fuse low-layer edge features and high-layer semantic features, then the preset picture size is restored through an upsampling layer, and center point coordinates and a center point probability of the parking spot, first coordinates and first corner point probabilities of the four corner points, and offsets (X, Y, L) of the four corner points relative to the center point coordinates are predicted at the output layer, where X, Y, and L represent an X direction, a Y direction, and a distance, respectively.

Optionally, the output layer includes 10 layers of corner point feature maps of the preset picture size, and 12 layers of offset feature maps of the preset picture size, where the first five layers of corner point feature maps represent idle parking spots, the last five layers represent occupied parking spots, each of the five layers represents features of the center point and the four corner points, the idle parking spots and the occupied parking spots share the offset feature maps, and each corner point has three offsets, representing the X direction, the Y direction, and the distance L, respectively, with a total of four corner points and 12 layers of features.

An aspect of the invention provides a computer-readable medium having a computer program stored thereon, where when the computer program is executed by a processor, a parking spot detection method as described above is implemented.

An aspect of the invention provides a computer device, which includes a storage module, a processor, and a computer program stored on the storage module and executable on the processor, where when the computer program is executed by a processor, a parking spot detection system as described above is implemented.

The parking spot detection method and the parking spot detection system according to the invention can effectively improve a recall of parking spots in a parking lot, and can improve the positioning accuracy of the parking spots.

DETAILED DESCRIPTION OF EMBODIMENTS

Figure 1:
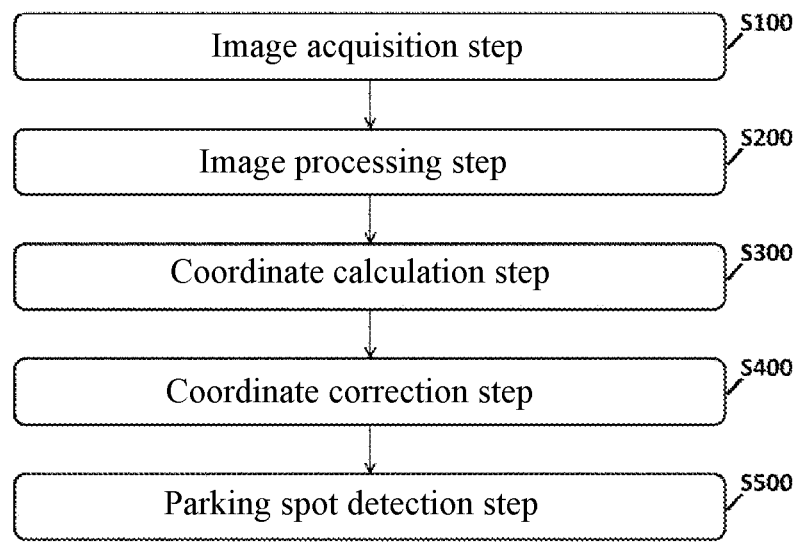
FIG. 1 is a schematic flowchart of a parking spot detection method according to an aspect of the invention.

Some of the embodiments of the invention are described below and are intended to provide a basic understanding of the invention. They are not intended to confirm key or decisive elements of the invention or limit the scope of protection.

For concise and illustrative purposes, this specification mainly describes the principles of the invention with reference to its exemplary embodiments. However, those skilled in the art will readily recognize that the same principles can be equivalently applied to all types of parking spot detection methods and parking spot detection systems, and the same principles can be implemented therein. Any such changes do not depart from the true spirit and scope of this patent application.

Moreover, in the following description, reference is made to the accompanying drawings, which illustrate specific exemplary embodiments. Electrical, mechanical, logical, and structural changes can be made to these embodiments without departing from the spirit and scope of the invention. Furthermore, although the features of the invention are disclosed in combination with only one of several implementations/embodiments, if any given or recognizable function may be desired and/or advantageous, this feature can be combined with one or more other features of other implementations/embodiments. Therefore, the following description should not be considered in a limiting sense, and the scope of the invention is defined by the appended claims and their equivalents.

The terms such as "have" and "include" indicate that in addition to the units (modules) and steps that are directly and clearly described in the specification and the claims, other units (modules) and steps that are not directly or clearly described are not excluded in the technical solutions of the invention.

A concept of a parking spot detection method of the invention lies in that, based on a parking lot picture including one or more idle and occupied parking spots around a vehicle and obtained from a camera on a vehicle body, the picture is sent to a neural network for processing, to obtain center point coordinates and a probability (P, X, Y), and fine coordinates and probabilities of four corner points of the parking spot, and obtain coordinate offsets (directions X and Y, and a distance L) of the four corner points relative to the center point at the same time; based on the obtained center point coordinates and probability, center point coordinates of all the idle parking spots and occupied parking spots are filtered; rough coordinates of the four corner points are calculated based on the obtained coordinate offsets of the four corner points relative to the center point of the parking spot; then the previously obtained fine coordinates of the four corner points are matched within a specific range around each corner point, and are used as actual coordinates and probabilities of the four corner points of the parking spot; and a probability of the current parking spot is recalculated based on the center point coordinate probability and the actual coordinates and probabilities of the four corner points, for the use in subsequent repeated parking spot filter logic.

FIG. 1 is a schematic flowchart of a parking spot detection method according to an aspect of the invention.

As shown in FIG. 1, the parking spot detection method of the invention includes the following steps:

- an image acquisition step S100: acquiring a parking lot image including one or more idle and occupied parking spots around a vehicle;
- an image processing step S200: inputting the parking lot image to a neural network model for image processing, to obtain center point coordinates and a center point probability of the parking spot, first coordinates and first corner point probabilities of four corner points, and offsets of the four corner points relative to the center point coordinates;
- a coordinate calculation step S300: calculating second coordinates of the four corner points based on the center point coordinates and the offsets of the four corner points relative to the center point coordinates;
- a coordinate correction step S400: correcting the second coordinates of the four corner points by using the first coordinates of the four corner points, to obtain actual coordinates and actual corner point probabilities of the four corner points; and
- a parking spot detection step S500: performing parking spot detection based on the center point coordinates and the center point probability, and the actual coordinates and actual corner point probabilities of the four corner points.

Next, steps S100 to S500 are described in detail.

In the image acquisition step S100, the parking lot image including the one or more idle and occupied parking spots around the vehicle may be acquired by using a camera on a vehicle body.

In the image processing step S200, the corner point coordinates of the parking spot are predicted based on a heat map, so that the very accurate first coordinates and first corner probabilities of the four corner points of the parking spot, center point coordinates and center point probability of the parking spot, and offsets of the four corner points relative to the center point coordinates are obtained. Herein, the "first coordinates" are also referred to as "fine coordinates" because of its relatively high accuracy.

Figure 2:
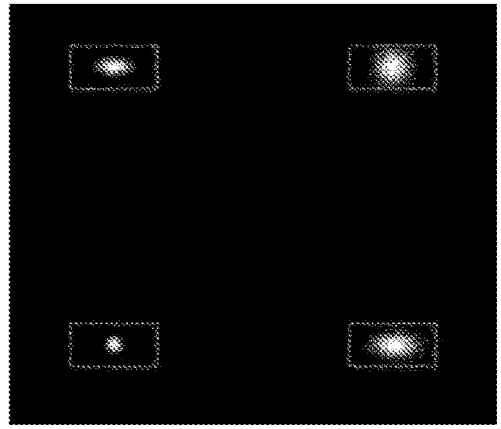
FIG. 2 is a schematic diagram of a heat map for predicting corner points.

FIG. 2 is a schematic diagram of a heat map for predicting corner points.

As shown in FIG. 2, for each picture, an annotator annotates coordinates of all parking spot corner points in the picture. Since an annotation result usually has an error, for example, actual coordinates and annotated coordinates are different by a few pixels, if a neural network is used to predict coordinates of this pixel, only this pixel is a positive sample, and the other pixels are all negative samples. There are few features that can be learned by a network, and a result tends to be poor. To solve such a problem, in a neural network model of the invention, for each parking spot corner point, a series of point clouds are drawn within a specific range around the corner point by using Gaussian distribution, and are used as a result of model prediction. By assigning specific weights around the corner point coordinates instead of only predicting a peak value of one pixel of the corner point, the model can predict very accurate corner point coordinates.

Figure 3:
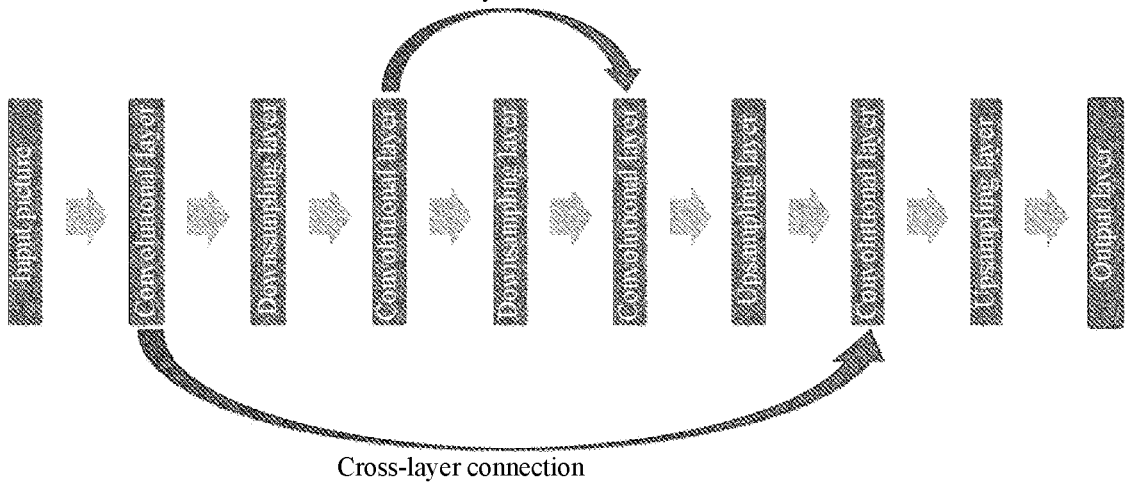
FIG. 3 is a schematic diagram showing a specific process of an image processing step.

FIG. 3 is a schematic diagram showing a specific process of an image processing step.

As shown in FIG. 3, in the image processing step S200, for the input parking lot image, a picture size of, e.g., 384*384 is used, image features are extracted through a plurality of convolutional layers and downsampling layers, a cross-layer connection is used to fuse low-layer edge features and high-layer semantic features, then the picture size of 384*384 is restored through an upsampling layer, and center point coordinates and a center point probability of the parking spot, first coordinates and first corner point probabilities of the four corner points, and offsets (X, Y, L) of the four corner points relative to the center point coordinates are predicted at the output layer, where X, Y, and L represent an X direction, a Y direction, and a distance, respectively.

The output layer includes 10 layers of corner point feature maps of the preset picture size, and 12 layers of offset feature maps of the preset picture size, where the first five layers of corner point feature maps represent idle parking spots, the last five layers represent occupied parking spots, each of the five layers represents features of the center point and the four corner points, the idle parking spots and the occupied parking spots share the offset feature maps, and each corner point has three offsets, representing the X direction, the Y direction, and the distance L, respectively, with a total of four corner points and 12 layers of features.

Figure 4:
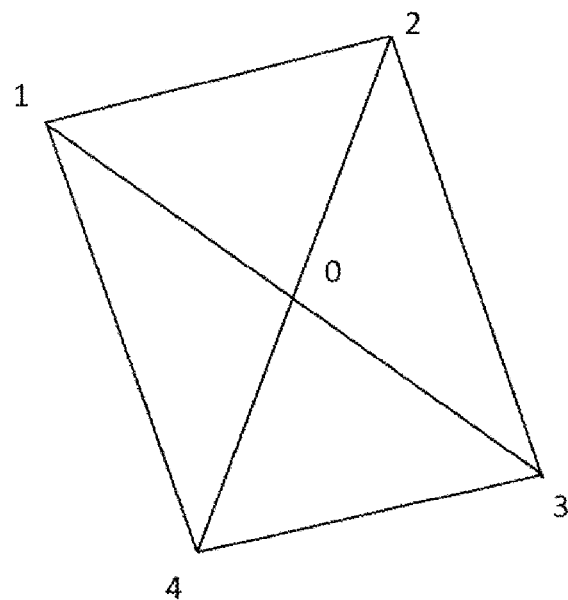
FIG. 4 is a schematic diagram of a coordinate calculation step.

FIG. 4 is a schematic diagram of a coordinate calculation step.

After the foregoing image processing step S200, the center point coordinates and the offsets (X, Y, L) of the four corner points relative to the center point coordinates can be obtained. Next, in the coordinate calculation step S300, as shown in FIG. 4, based on the center point coordinates ("0" in FIG. 4) and the offsets (X, Y, L) of the four corner points relative to the center point coordinates, second coordinates of the four corner points ("1 to 4" in FIG. 4) can be calculated. Herein, the "second coordinates" are also referred to as "rough coordinates" because their accuracy is not as high as the "fine coordinates" obtained by the heat map in step S200.

Figure 5:
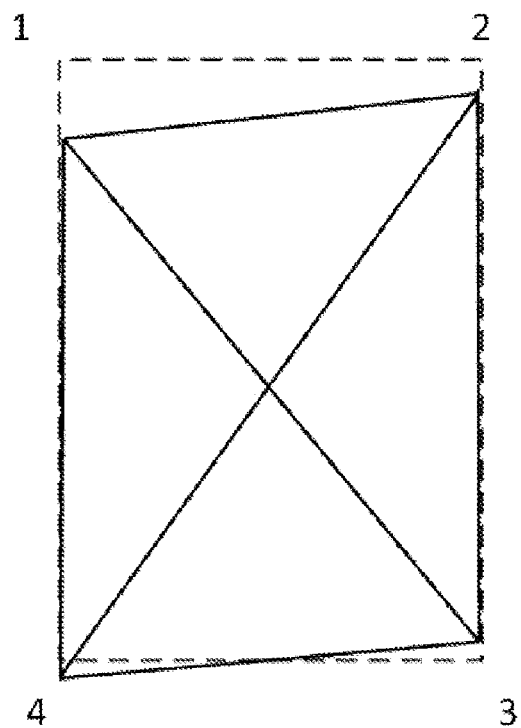
FIG. 5 is a schematic diagram of a coordinate correction step.

FIG. 5 is a schematic diagram of a coordinate correction step.

As shown in FIG. 5, in the coordinate correction step S400, for the rough coordinates of the corner point coordinates 1 of the four corner points calculated in the coordinate calculation step S300, an area of a preset size is circled at a position of the coordinates (that is, an area of a preset size is divided with a position of the second coordinates of the corner point as the center), the fine coordinates obtained by the heat map of the corner point are found in the area (that is, the first coordinates obtained in the image processing step S200), the rough coordinates are replaced with the obtained fine coordinates, and similar processing is performed on the remaining three corner points; finally, four corner points in a box shown by the dashed line in FIG. 5 are obtained, that is, the corrected corner point coordinates.

In the parking spot detection step S500, parking spot detection is performed based on the center point coordinates and the center point probability, and the actual coordinates of the four corner points. As an example, assuming that the center point probability is P0, and the probabilities of the corrected corner points of the four corner points are P1, P2, P3, P4, respectively, a final probability P of the parking spot is 0.6*P0+0.1*(P1+P2+P3+P4).

Due to various factors such as occlusion and unclear parking spot lines on the image, using the center point to directly return to the four corner points has a large offset error. If the corner points are predicted and the corner points are grouped (e.g., using a clustering algorithm) into an independent parking spot, when there are a plurality of parking spots in the image, a clustering result is usually not stable enough and post-processing is very complicated, resulting in more parking spot missed detection. In contrast, by using the above-mentioned parking spot detection method of the invention, very accurate parking spot coordinates can be obtained, and the recalculated parking spot probability combines the probabilities of the center point and the four corner points, which can represent very accurately a probability that the parking spot is the actual parking spot, and can greatly reduce false detection and missed detection of the parking spots.

Figure 6:
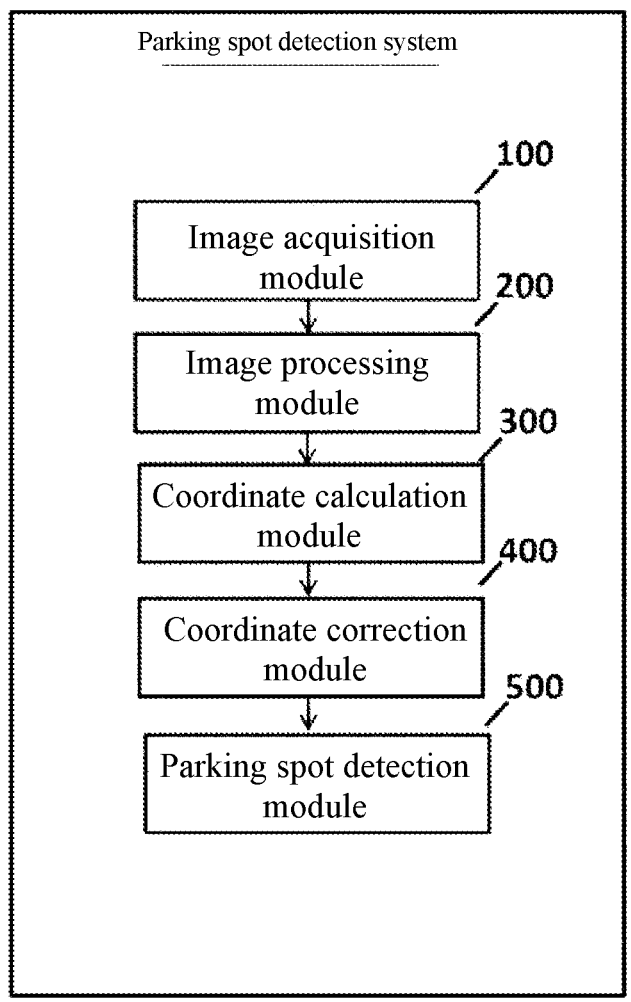
FIG. 6 is a structural block diagram of a parking spot detection system according to an aspect of the invention.

FIG. 6 is a structural block diagram of a parking spot detection system according to an aspect of the invention.

As shown in FIG. 6, an aspect of the invention provides a parking spot detection system, the system including:

- an image acquisition module 100 configured to acquire a parking lot image including one or more idle and occupied parking spots around a vehicle;
- an image processing module 200 configured to input the parking lot image to a neural network model for image processing, to obtain center point coordinates and a center point probability of the parking spot, first coordinates (fine coordinates) and first corner point probabilities of four corner points, and offsets of the four corner points relative to the center point coordinates;
- a coordinate calculation module 300 configured to calculate second coordinates (rough coordinates) of the four corner points based on the center point coordinates and the offsets of the four corner points relative to the center point coordinates;
- a coordinate correction module 400 configured to correct the second coordinates of the four corner points by using the first coordinates of the four corner points, to obtain actual coordinates and actual corner point probabilities of the four corner points; and
- a parking spot detection module 500 configured to perform parking spot detection based on the center point coordinates and the center point probability, and the actual coordinates and actual corner point probabilities of the four corner points.

In the coordinate correction module 400, for each of the second coordinates of the four corner points, an area of a specified size is circled at a position of the coordinates, the first coordinates of the corner point are found in the area, and the second coordinates are replaced with the first coordinates found.

In the parking spot detection module 500, a final probability of the parking spot is calculated based on the center point probability and the actual corner point probabilities of the four corner points. As an example, in the parking spot detection module 500, the center point probability is P0, probabilities of corrected corner points of the four corner points are P1, P2, P3, and P4, respectively, and the final probability P of the parking spot is 0.6*P0+0.1*(P1+P2+P3+P4).

In the image processing module 200, for the parking lot image, a preset picture size is used, image features are extracted through a plurality of convolutional layers and downsampling layers, a cross-layer connection is used to fuse low-layer edge features and high-layer semantic features, then the preset picture size is restored through an upsampling layer, and center point coordinates and a center point probability of the parking spot, first coordinates and first corner point probabilities of the four corner points, and offsets (X, Y, L) of the four corner points relative to the center point coordinates are predicted at the output layer, where X, Y, and L represent an X direction, a Y direction, and a distance, respectively.

The output layer includes 10 layers of corner point feature maps of the preset picture size, and 12 layers of offset feature maps of the preset picture size, where the first five layers of corner point feature maps represent idle parking spots, the last five layers represent occupied parking spots, each of the five layers represents features of the center point and the four corner points, the idle parking spots and the occupied parking spots share the offset feature maps, and each corner point has three offsets, representing the X direction, the Y direction, and the distance L, respectively, with a total of four corner points and 12 layers of features.

The invention further provides a computer-readable medium having a computer program stored thereon, where when the computer program is executed by a processor, a parking spot detection system as described above is implemented.

The invention further provides a computer device, which includes a storage module, a processor, and a computer program stored on the storage module and executable on the processor, where when the computer program is executed by the processor, a parking spot detection system as described above is implemented.

As described above, in the parking spot detection method and parking spot detection system of the invention, a neural network model is designed to input an image having parking spots and output feature maps of four corner points of a parking spot, a feature map of a center point of the parking spot, coordinate offsets of the corner points relative to the center point, and whether the parking spot is available, which can bring the following technical effects: A lightweight network design is used and can be run in real time on an edge computing platform; a parking spot recall is high, a false detection rate is low, and the invention can be used as a visual perception portion of fully automatic parking and can be integrated with radar and other signals; and conventional parking spots such as parallel and perpendicular parking spots and unconventional parking spots such as angle parking spots can be supported, and an algorithm is robust.

Moreover, the parking spot detection method and parking spot detection system according to the invention can effectively solve the following problems: the problem of a low recall of parking spots when only relying on radar for automatic parking in a parking lot; the problem of a poor positioning accuracy in other parking spot detection methods that use only a center point and corner point offsets to detect parking spots; and an availability status of parking spots can be output, and unavailability is output for car occupancy, cone barrels, ground locks, etc. in the parking spots.

As described above, the parking spot detection method and the parking spot detection system of the invention can provide visual perception of parking spots for an automatic parking system, and improve a recall of parking spots and positioning accuracy of corner points. In addition, the invention proposes a deep learning network applicable to an edge computing platform, thereby implementing a lightweight network design and a high parking spot recall. Moreover, the invention supports detection of idle parking spots and occupied parking spots at the same time, and can support the automatic parking system to display these two parking spots on the UI, providing a better display experience.

The above examples mainly illustrate the parking spot detection method and the parking spot detection system of the invention. Although only some specific implementations of the invention are described, a person of ordinary skill in the art should understand that the invention may be implemented in multiple other forms without departing from the essence and scope of the invention. Accordingly, the presented examples and implementations are considered to be illustrative rather than restrictive, and the invention may encompass various modifications and replacements without departing from the spirit and scope of the invention that are defined by the appended claims.

What is claimed is:

1. A parking spot detection method, comprising:
an image acquisition step of acquiring a parking lot image comprising one or more idle and occupied parking spots around a vehicle;
an image processing step of inputting the parking lot image to a neural network model for image processing, to obtain center point coordinates and a center point probability of the parking spot, first coordinates and first corner point probabilities of four corner points, and offsets of the four corner points relative to the center point coordinates;
a coordinate calculation step of calculating second coordinates of the four corner points based on the center point coordinates and the offsets of the four corner points relative to the center point coordinates;
a coordinate correction step of correcting the second coordinates of the four corner points by using the first coordinates of the four corner points, to obtain actual coordinates and actual corner point probabilities of the four corner points; and
a parking spot detection step of performing parking spot detection based on the center point coordinates and the center point probability, and the actual coordinates and actual corner point probabilities of the four corner points.

2. The parking spot detection method of claim 1, wherein the coordinate correction step is performed by, for each of the four corner points, finding the first coordinates of the corner point in an area having a preset size and being circled at a position of the second coordinates of the corner point as the center, and replacing the second coordinates with the first coordinates as found.

3. The parking spot detection method of claim 1, wherein in the parking spot detection step, a final probability of the parking spot is calculated based on the center point probability and the actual corner point probabilities of the four corner points.

4. The parking spot detection method of claim 3, wherein in the parking spot detection step, the center point probability is P0, probabilities of corrected corner points of the four corner points are P1, P2, P3, and P4, respectively, and the final probability P of the parking spot is $0.6*P0+0.1*(P1+P2+P3+P4)$.

5. The parking spot detection method of claim 1, wherein in the image processing step, for the parking lot image, a preset picture size is used, image features are extracted through a plurality of convolutional layers and downsampling layers, a cross-layer connection is used to fuse low-layer edge features and high-layer semantic features, then the preset picture size is restored through an upsampling layer, and center point coordinates and a center point probability of the parking spot, first coordinates and first corner point probabilities of the four corner points, and offsets (X, Y, L) of the four corner points relative to the center point coordinates are predicted at the output layer, wherein X, Y, and L represent an X direction, a Y direction, and a distance, respectively.

6. The parking spot detection method of claim 5, wherein the output layer comprises 10 layers of corner point feature maps of the preset picture size, and 12 layers of offset feature maps of the preset picture size, wherein the first five layers of corner point feature maps represent idle parking spots, the last five layers represent occupied parking spots, each of the five layers represents features of the center point and the four corner points, the idle parking spots and the occupied parking spots share the offset feature maps, and each corner point has three offsets, representing the X direction, the Y direction, and the distance L, respectively, with a total of four corner points and 12 layers of features.

7. A computer device, comprising a storage module, a processor, and a computer program stored on a non-transitory computer-readable medium and executable on the processor, wherein when the computer program is executed by the processor, a parking spot detection method is implemented, the method comprising:
an image acquisition step of acquiring a parking lot image comprising one or more idle and occupied parking spots around a vehicle;
an image processing step of inputting the parking lot image to a neural network model for image processing, to obtain center point coordinates and a center point probability of the parking spot, first coordinates and first corner point probabilities of four corner points, and offsets of the four corner points relative to the center point coordinates;
a coordinate calculation step of calculating second coordinates of the four corner points based on the center point coordinates and the offsets of the four corner points relative to the center point coordinates;
a coordinate correction step of correcting the second coordinates of the four corner points by using the first coordinates of the four corner points, to obtain actual coordinates and actual corner point probabilities of the four corner points; and
a parking spot detection step of performing parking spot detection based on the center point coordinates and the center point probability, and the actual coordinates and actual corner point probabilities of the four corner points.

8. The computer device of claim 7, wherein the coordinate correction step is performed by, for each of the four corner points, finding the first coordinates of the corner point in an area having a preset size and being circled at a position of the second coordinates of the corner point as the center, and replacing the second coordinates with the first coordinates as found.

9. The computer device of claim 7, wherein in the parking spot detection step, a final probability of the parking spot is calculated based on the center point probability and the actual corner point probabilities of the four corner points.

10. The computer device of claim 9, wherein in the parking spot detection step, the center point probability is P0, probabilities of corrected corner points of the four corner points are P1, P2, P3, and P4, respectively, and the final probability P of the parking spot is $0.6*P0+0.1*(P1+P2+P3+P4)$.

11. The computer device of claim 7, wherein in the image processing step, for the parking lot image, a preset picture size is used, image features are extracted through a plurality of convolutional layers and downsampling layers, a cross-layer connection is used to fuse low-layer edge features and high-layer semantic features, then the preset picture size is restored through an upsampling layer, and center point coordinates and a center point probability of the parking spot, first coordinates and first corner point probabilities of the four corner points, and offsets (X, Y, L) of the four corner points relative to the center point coordinates are predicted at the output layer, wherein X, Y, and L represent an X direction, a Y direction, and a distance, respectively.

12. The computer device of claim 11, wherein the output layer comprises 10 layers of corner point feature maps of the preset picture size, and 12 layers of offset feature maps of the preset picture size, wherein the first five layers of corner point feature maps represent idle parking spots, the last five layers represent occupied parking spots, each of the five layers represents features of the center point and the four corner points, the idle parking spots and the occupied parking spots share the offset feature maps, and each corner point has three offsets, representing the X direction, the Y direction, and the distance L, respectively, with a total of four corner points and 12 layers of features.

* * * * *